US006215979B1

(12) United States Patent
Park

(10) Patent No.: US 6,215,979 B1
(45) Date of Patent: Apr. 10, 2001

(54) APPARATUS AND METHOD FOR GENERATING ALERT IN RADIO PAGING RECEIVER

(75) Inventor: Keon-Young Park, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/143,320

(22) Filed: Aug. 28, 1998

(30) Foreign Application Priority Data

Aug. 28, 1997 (KR) ........................................ 97-41871

(51) Int. Cl.[7] ........................................ H04Q 7/18

(52) U.S. Cl. .................. 455/31.2; 455/38.2; 340/825.44

(58) Field of Search .................................. 455/31.2, 458, 455/567, 38.1, 38.2; 340/825.44, 311.1, 825.47, 825.48, 384.7, 384.71

(56) References Cited

U.S. PATENT DOCUMENTS

| | | | | |
|---|---|---|---|---|
| H1173 | * | 4/1993 | Davis et al. | 340/825.44 |
| 5,287,099 | | 2/1994 | Tsunoda | 340/825.44 |
| 5,303,284 | * | 4/1994 | Shinozaki | 455/567 |
| 5,570,421 | * | 10/1996 | Morishima | 379/396 |
| 6,014,572 | * | 1/2000 | Takahashi | 455/567 |

OTHER PUBLICATIONS

P205 of the H8/3834 series hardware manual published by Hitachi in 1994.

* cited by examiner

*Primary Examiner*—William G. Trost
(74) *Attorney, Agent, or Firm*—Dilworth & Barrese, LLP

(57) ABSTRACT

An alert generating method for a radio paging receiver that performs the steps of generating a continuous alert signal having a predetermined alert frequency using a timer circuit disposed in a microcontroller of a radio paging receiver when self information of the radio paging receiver is detected from a received radio paging signal and generating an alert in response to the continuous alert signal. The step of generating a continuous alert signal further performs the steps of scaling a frequency of an input signal to a second predetermined frequency, setting the predetermined alert frequency, comparing the second predetermined frequency to the predetermined alert frequency and generating the continuous alert signal having the predetermined alert frequency, when the second predetermined frequency matches the predetermined alert frequency. The alert generating device for use in a radio paging receiver comprises an antenna, a radio circuit for frequency-converting, demodulating, and waveform-shaping the received radio paging signal to generate digital data, a decoder for decoding the digital data, and a microcontroller having a timer circuit, the microcontroller analyzing the decoded data to determine if the decoded data includes self information of the radio paging receiver, and generating a continuous alert signal having a predetermined alert frequency using the timer circuit, when the decoded data includes the self information.

6 Claims, 4 Drawing Sheets

APPARATUS AND METHOD FOR GENERATING ALERT IN RADIO PAGING RECEIVER

BACKGROUND OF THE INVENTION

1. Field of the Invention

The present invention relates to radio paging receivers and, more particularly, to an apparatus and method for generating an alert in a radio paging receiver.

2. Description of the Related Art

A radio paging receiver receives and analyzes a radio paging signal in a specific form. Upon the detection of self information from the received paging signal, the radio paging receiver displays the paging information (or message) and generates an alert. The self information is information which identifies the received paging signal as being associated with the radio paging receiver. Typically, the paging information is displayed on a liquid crystal display (LCD) and the alert is provided to the user through a speaker to notify the user that he or she has been paged.

Conventionally, in order to generate the alert for informing the user that paging information has been received, a decoder or an additional alert signal generator has been used. An example of such a decoder is disclosed in U.S. Pat. No. 5,287,099, entitled "Multi-Alert Radio Paging System". Referring to FIG. 1 herein, a block diagram of a conventional decoder is shown. The conventional decoder includes an alert mode controller 404 and an alert pattern generator 405 to generate the alert.

Referring to FIG. 2, a conventional paging receiver which includes an alert signal generator 192 is shown. If a determination has been made by a decoder 120 indicating that self information has been received, a microcontroller 150 generates the alert by controlling alert signal generator 192. The alert is output to the exterior through an alert unit 190.

On the other hand, in order to generate the alert using decoder 120, the elements for generating the alert must be included in the decoder. The frequency required to generate the alert is typically 2.7 or 3.2 KHz. If an incorrect frequency is used, the alert may not be generated normally. In the worst case, the decoder may need to be replaced with a new one.

Thus, in order for the conventional radio receiver to generate the alert using alert signal generator 192, the conventional radio receiver must employ alert generator 192 operatively connected between microcontroller 150 and alert unit 190. However, the use of alert signal generator 192 increases the complexity, cost, and size of the radio paging receiver in which it is employed.

SUMMARY OF THE INVENTION

It is an object of the present invention to provide an apparatus and method for generating an alert in a radio paging receiver which reduces the cost and the size of the radio paging receiver.

To achieve the above and other objects, an alert generating method for a radio paging receiver is provided. The method includes the steps of: generating an alert signal having a predetermined frequency using a timer circuit disposed in a microcontroller of the radio paging receiver, when self information of the radio paging receiver is detected from a received radio paging signal; and generating an alert in response to the alert signal.

According to another aspect of the invention, an alert generating apparatus in a radio paging receiver is provided. The apparatus includes: an antenna for receiving a radio paging signal; a radio circuit for frequency-converting, demodulating, and waveform-shaping the received radio paging signal to generate digital data; a decoder for decoding the digital data; a microcontroller having a timer circuit, said microcontroller analyzing the decoded data to determine if the decoded data includes self information of the radio paging receiver, and generating an alert signal of a predetermined frequency using the timer circuit, when the decoded data includes the self information; and an alert unit connected to an output terminal of said timer circuit, for generating an alert corresponding to said alert signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Figure 1:
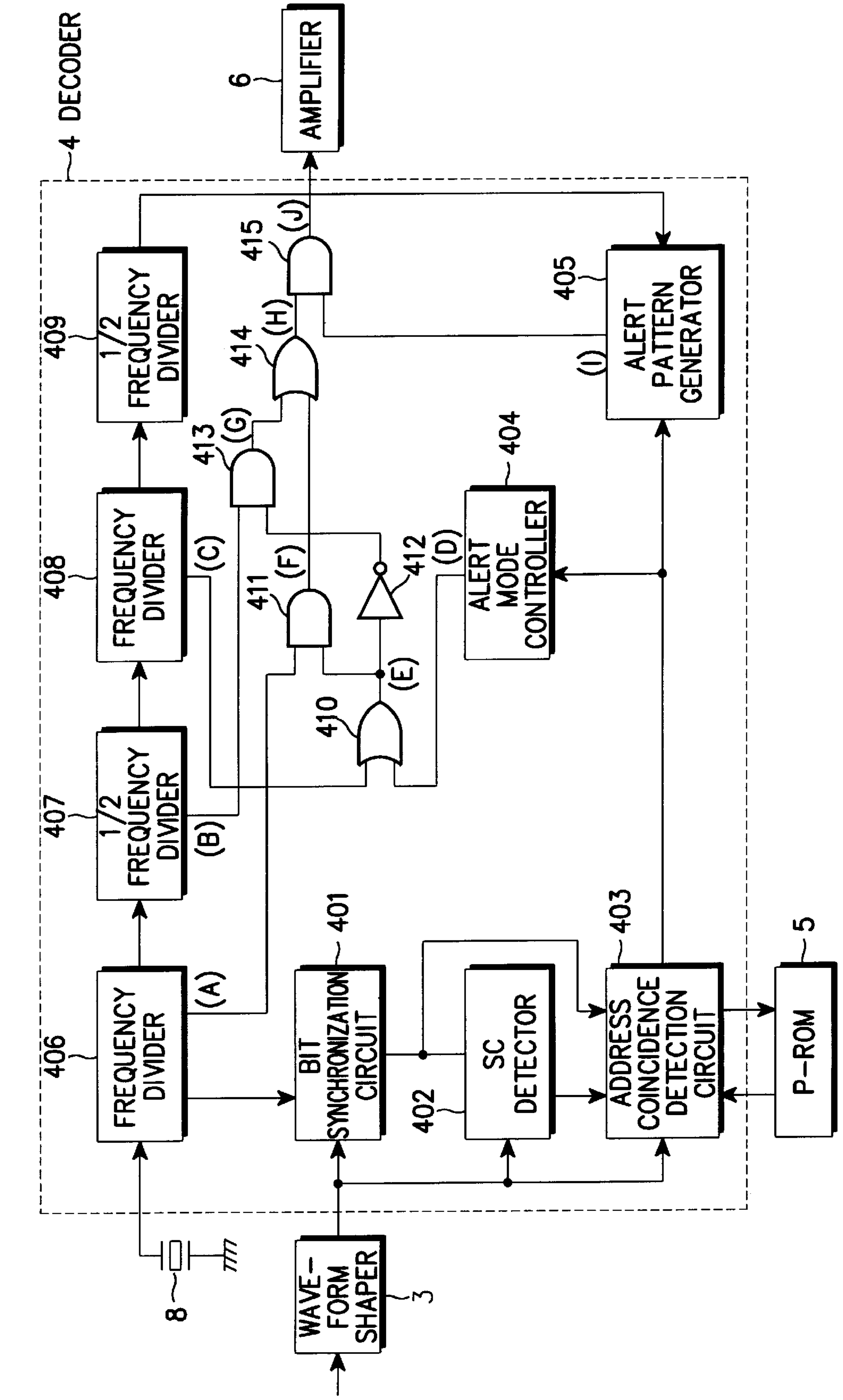
(PRIOR ART) FIG. 1
FIG. 1 is a block diagram illustrating a conventional decoder.

The descriptions of various configurations and components of the present invention known to one skilled in the art are omitted for the sake of clarity and brevity. Also, in the figures, similar reference numerals designate similar elements.

Figure 3:
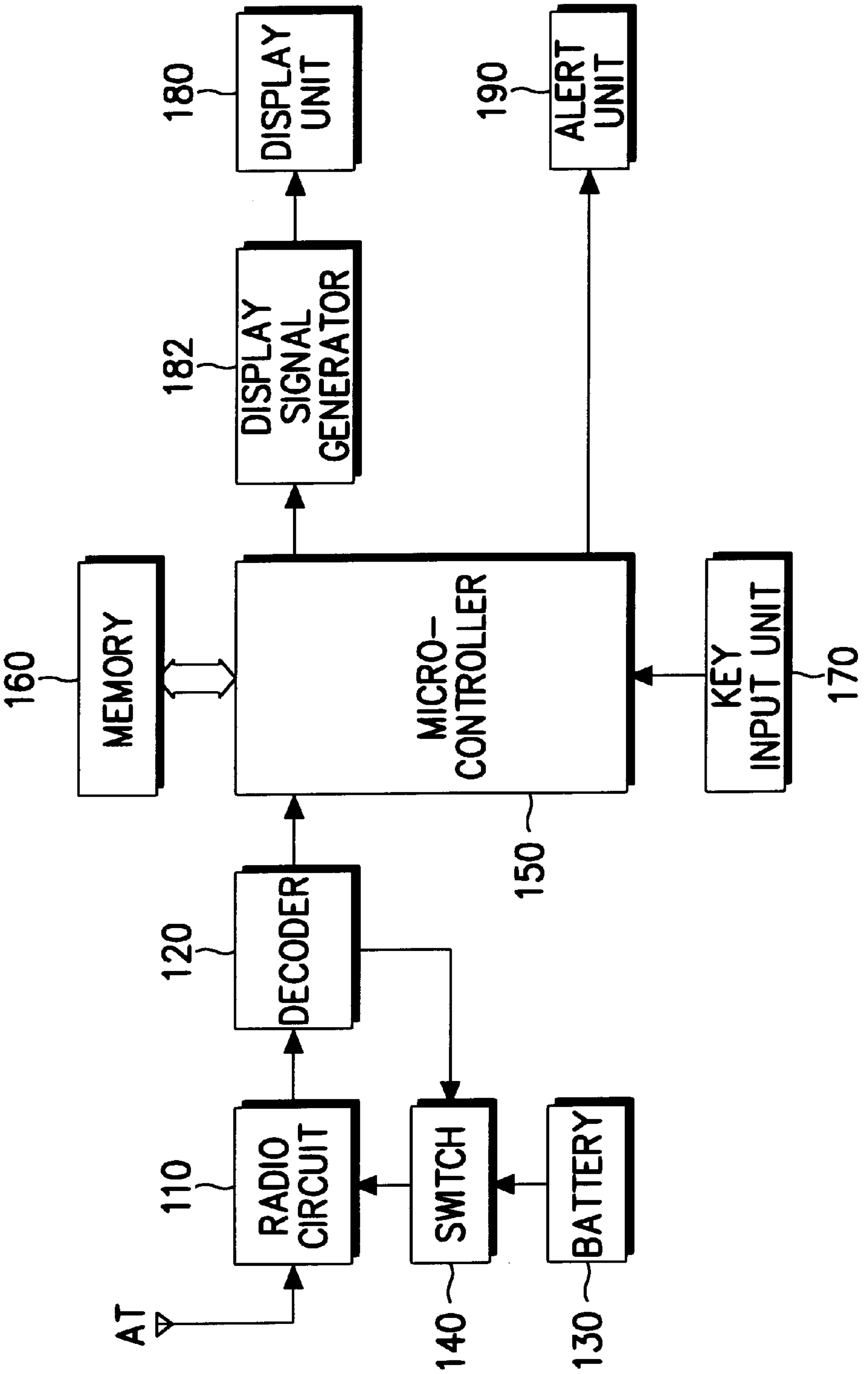
FIG. 3 is a block diagram illustrating a radio paging receiver according to an embodiment of the present invention.

FIG. 3 is a block diagram illustrating a radio paging receiver according to an embodiment of the present invention. The receiver includes a radio circuit 110 operatively connected to an antenna AT, a decoder 120, and a switch 140. The switch 140 is operatively connected to a battery 130. A microcontroller is operatively coupled to decoder 120, a memory 160, a key input unit 170, a display signal generator 182, and an alert unit 190. The display signal generator 182 is operatively coupled to a display unit 180.

If a radio paging signal is received, the radio paging receiver judges whether or not the received signal includes the self information of the radio paging receiver. If so, the radio paging receiver generates an alert to the exterior.

The radio circuit 110 receives a radio paging signal through antenna AT and performs various functions with respect to the received signal, such as frequency conversion, demodulation and waveform shaping. Thereafter, the radio circuit 110 outputs digital radio paging data to decoder 120. The decoder 120 decodes the received data and sets the operating mode of the radio paging receiver. In order to detect preamble data during an idle mode, decoder 120 controls the power supplied from battery 130 by periodically controlling switch 140. During a batch mode, decoder 120 detects word synchronizing data and frame data (address codeword+message codeword). The decoder 120 decodes the detected frame data in order to convert the frame data into its original form.

The memory 160 stores a unique (self) address allocated to the radio paging receiver and the frame data, and also stores a paging message from a caller (or paging party) which has been processed by microcontroller 150. The key input unit 170 interfaces the radio paging receiver with the user. The key input unit 170 has two or three switches, such as a function switch for indicating various operating modes of the radio paging receiver, a switch for confirming (or reading) the message from the caller, and a switch for selecting a desired operating mode.

The microcontroller 150 controls the overall operation of the radio paging receiver. For example, microcontroller 150 generates an alert signal and a display control signal upon processing the decoded data generated from decoder 120. More specifically, microcontroller 150 compares the data generated from decoder 120 with the self address stored in memory 160, and generates the alert signal if the radio paging signal includes the self information of the radio paging receiver. The microcontroller 150 generates the display control signal so that the paging message from the caller can be displayed on display unit 180. Additionally, microcontroller 150 stores the paging message in memory 160.

The display unit 180 displays the message from the caller and the status of the radio paging receiver. The display unit 180 is typically comprised of a liquid crystal display (LCD). The display signal generator 182 converts the paging message from the caller and the status information of the radio paging receiver into signals which can be displayed on display unit 180 according to the display control signal generated from microcontroller 150. For example, the message from the caller may be a telephone number of the caller.

The alert unit 190 is comprised of a speaker and a motor. Upon receiving the alert control signal generated from microcontroller 150, alert unit 190 generates an alert tone or vibrates the paging receiver to inform the user of the reception of a paging message. The alert unit 190 will generate the alert tone in a sound mode, and vibrate the paging receiver in a silent mode.

Figure 2:
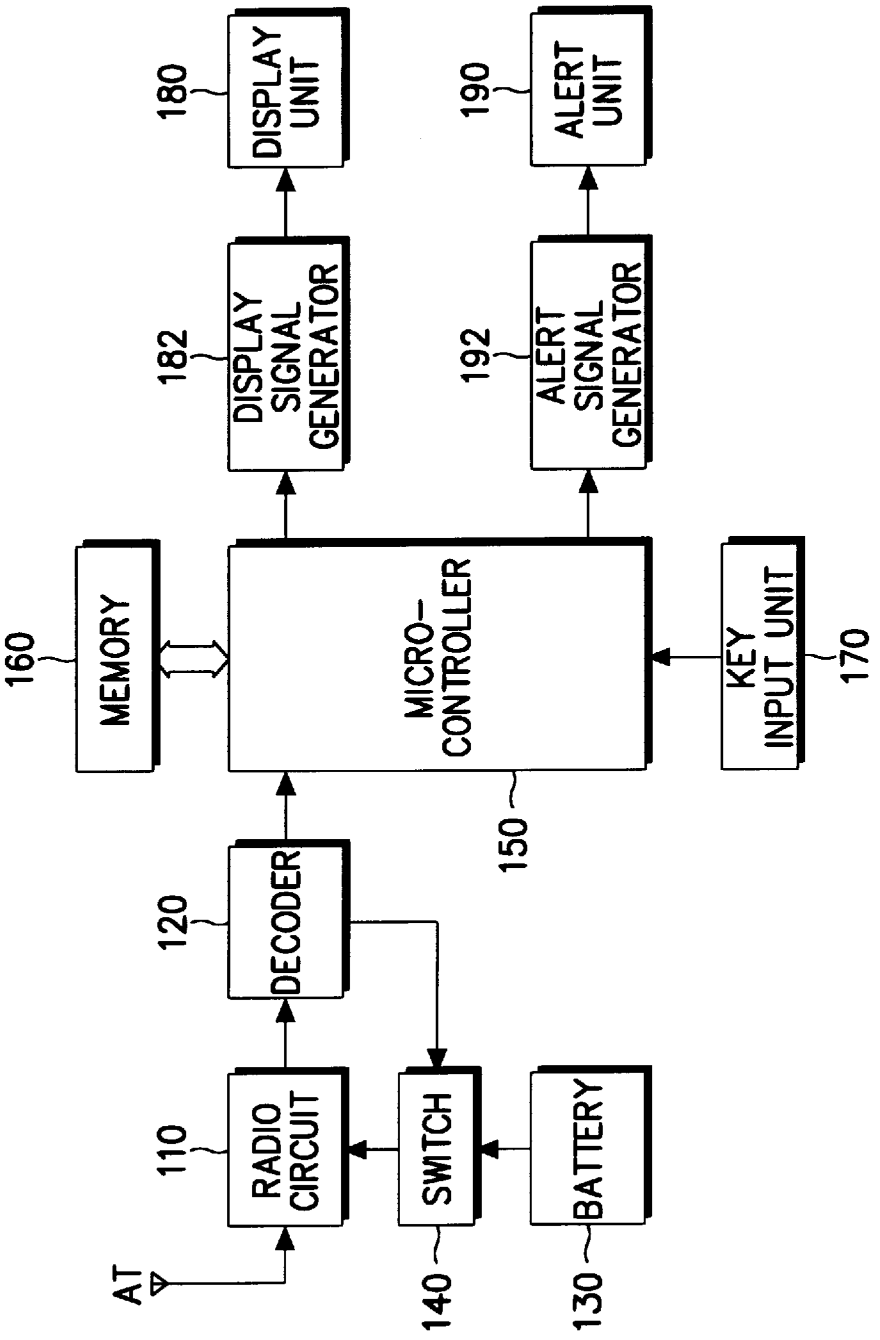
(PRIOR ART) FIG. 2
FIG. 2 is a block diagram illustrating a conventional radio paging receiver having an alert signal generator.

It should be noted that the radio paging receiver of the invention does not include the alert signal generator 192 shown in FIG. 2 disposed between microcontroller 150 and alert unit 190. As will be described below with reference to FIG. 4, an alert is generated by the radio paging receiver according to the invention without the use of alert signal generator 192.

Figure 4:
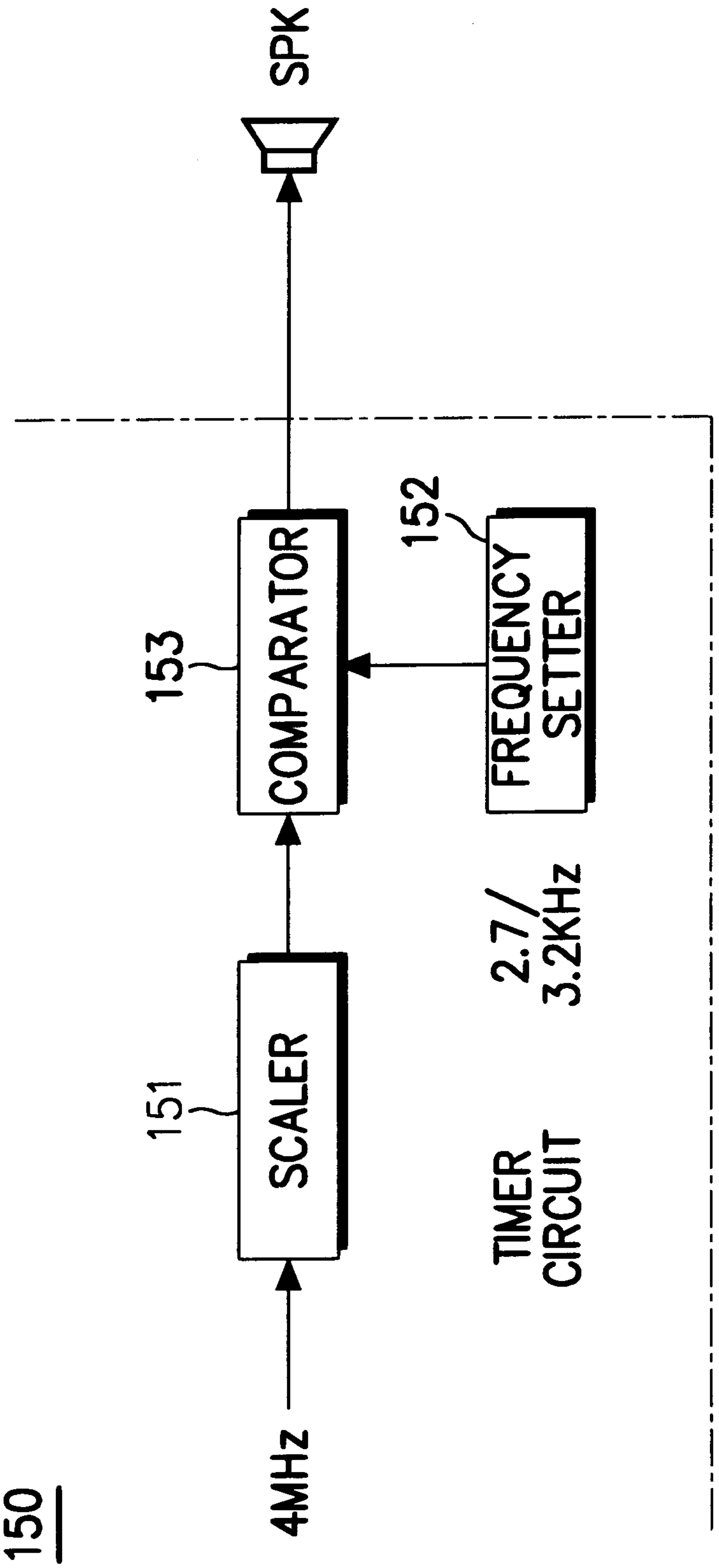
FIG. 4 is a block diagram illustrating a timer circuit disposed in a microcontroller shown in FIG. 3.

FIG. 4 is a block diagram illustrating a timer circuit disposed in the microcontroller 150 of FIG. 3. The timer circuit includes a comparator 153 operatively coupled to a scaler 151 and a frequency setter 152. The comparator 153 is also connected to a speaker SPK, such as the speaker of alert unit 190.

The timer circuit represents a timer F contained in a commercially available single-chip microcomputer which is employed as microcontroller 150. An example of such a microcomputer is HD6473837, manufactured by Hitachi, Japan. As described in page 205 of the H8/3834 Series Hardware Manual published by Hitachi in 1994, timer F includes a PSS (Prescaler S), a TCRF (Timer Control Register F), a TCFL (8-bit Timer Counter FL), an OCRFL (Output Compare Register FL), and a compare circuit. In FIG. 4, scaler 151, frequency setter 152, and comparator 153 correspond to the PSS, the OCRFL, and the compare circuit, respectively.

The scaler 151 scales (or converts) a 4 MHz frequency of an input signal into a predetermined frequency. The frequency setter 152 sets another predetermined frequency according to data provided through an internal data bus of microcontroller 150. For example, frequency setter 152 can set the frequency to 2.7 or 3.2 KHz, which correspond to the frequencies at which the commercially available radio paging receiver WITHME 3400 manufactured by Samsung Electronics generates an alert signal. The comparator 153 compares the frequency of the signal generated from scaler 151 with the frequency set by frequency setter 152 and, if they match, generates a signal with the frequency set by frequency setter 152. The signal generated from comparator 153 with the set frequency is an alert signal. As such, the frequency of the signal generated from comparator 153 corresponds to the frequency at which speaker SPK of alert unit 190 can generate the alert tone. In this way, speaker SPK, which is connected to an output terminal of the timer circuit, can generate the alert in response to the signal outputted from comparator 153.

Thus, the alert signal can be generated by using the timer circuit contained in microcontroller 150. This timer circuit is driven as a typical timer and further drives the speaker as the alert signal generator.

In sum, the timer circuit contained in the microcontroller is used to generate the alert signal. Therefore, an additional alert signal generating circuit is not required, either separately or as part of the decoder. As a result, a radio paging receiver according to the invention requires less components than a conventional radio paging receiver. Therefore, as compared to conventional radio paging receivers, a radio paging receiver according to the invention is more easily and economically constructed and requires less space. Moreover, the inconvenience in replacing the decoder when an improper decoder is used to generate the alert signal is eliminated.

While the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. An alert generating method for a radio paging receiver, comprising the steps of:

generating a continuous alert signal having a predetermined alert frequency using a timer circuit disposed in a microcontroller of the radio paging receiver, when self information of the radio paging receiver is detected from a received radio paging signal, said step of generating a continuous alert signal further comprising the steps of:

scaling a frequency of an input signal to a second predetermined frequency;

setting the predetermined alert frequency; and comparing the second predetermined frequency to the predetermined alert frequency and generating the continuous alert signal having the predetermined alert frequency, when the second predetermined frequency matches the predetermined alert frequency; and generating an alert in response to the continuous alert signal.

2. The method of claim 1, wherein the predetermined frequency corresponds to a frequency for driving an indicating means.

3. The method of claim 2, wherein the indicating means is a speaker.

4. An alert generating apparatus in a radio paging receiver, comprising:

an antenna for receiving a radio paging signal;

a radio circuit for frequency-converting, demodulating, and waveform-shaping the received radio paging signal to generate digital data;

a decoder for decoding the digital data;

a microcontroller having a timer circuit, said microcontroller analyzing the decoded data to determine if the decoded data includes self information of the radio paging receiver, and generating a continuous alert signal having a predetermined alert frequency using the timer circuit, when the decoded data includes the self information, said timer circuit further comprising:

a scaler for scaling a frequency of an input signal to a second predetermined frequency;

a frequency setter for setting the predetermined alert frequency; and a comparator for comparing the second predetermined frequency from said scaler to the predetermined alert frequency from said frequency setter and generating the continuous alert signal having the predetermined alert frequency, when the second predetermined frequency matches the predetermined alert frequency; and an alert unit connected to an output terminal of the timer circuit, for generating an alert corresponding to said continuous alert signal.

5. The apparatus of claim 4, wherein the predetermined frequency corresponds to a frequency for driving the alert unit.

6. The apparatus of claim 4, wherein the alert unit comprises a speaker.

* * * * *